(12) United States Patent
Abe et al.

(10) Patent No.: US 10,787,856 B2
(45) Date of Patent: Sep. 29, 2020

(54) GLASS PANEL UNIT AND GLASS WINDOW

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/328,484

(22) PCT Filed: Aug. 28, 2017

(86) PCT No.: PCT/JP2017/030675
§ 371 (c)(1),
(2) Date: Feb. 26, 2019

(87) PCT Pub. No.: WO2018/043376
PCT Pub. Date: Aug. 3, 2018

(65) Prior Publication Data
US 2019/0195003 A1    Jun. 27, 2019

(30) Foreign Application Priority Data
Aug. 31, 2016    (JP) .................................. 2016-170366

(51) Int. Cl.
*E06B 3/663* (2006.01)
*E06B 3/66* (2006.01)
(Continued)

(52) U.S. Cl.
CPC .............. *E06B 3/663* (2013.01); *B32B 17/06* (2013.01); *C03C 27/06* (2013.01); *E06B 3/6612* (2013.01);
(Continued)

(58) Field of Classification Search
CPC .......... E06B 3/66; E06B 3/6612; E06B 3/663; E06B 3/66328; E06B 3/66333; Y02B 80/24; Y02A 30/25
See application file for complete search history.

(56) References Cited

U.S. PATENT DOCUMENTS 5,124,185 A * 6/1992 Kerr ...................... E06B 3/6612
   428/34
5,270,084 A * 12/1993 Parker ..................... C03C 27/06
   428/34
(Continued)

FOREIGN PATENT DOCUMENTS

EP    0 999 330 A1    5/2000
JP    H11-311069 A    11/1999
(Continued)

OTHER PUBLICATIONS

Supplementary European Search Report dated Aug. 28, 2019. issued in the corresponding European Patent Application No. 17846381.6.
(Continued)

*Primary Examiner* — Donald J Loney
(74) *Attorney, Agent, or Firm* — McDermott Will & Emery LLP

(57) ABSTRACT

A glass panel unit includes: a sealing member arranged between a first panel and a second panel, which are arranged to face each other with a predetermined gap left between themselves, to hermetically bond the first panel and the second panel together; and an internal space sealed hermeti-
(Continued)

cally with the first panel, the second panel, and the sealing member. The glass panel unit further includes a spacer arranged in the internal space so as to be in contact with the first panel and the second panel. The spacer includes a plurality of resin layers that are stacked one on top of another in a direction in which the first panel and the second panel face each other. At least any two of the plurality of resin layers have different elastic moduli.

6 Claims, 12 Drawing Sheets

(51) Int. Cl.
*E06B 3/677* (2006.01)
*C03C 27/06* (2006.01)
*B32B 17/06* (2006.01)

(52) U.S. Cl.
CPC .......... *E06B 3/66304* (2013.01); *E06B 3/677* (2013.01); *B32B 2307/412* (2013.01); *E06B 3/66328* (2013.01); *E06B 3/66333* (2013.01); *Y02A 30/25* (2018.01); *Y02B 80/24* (2013.01)

(56) References Cited

U.S. PATENT DOCUMENTS

| 2003/0214623 | A1 | 11/2003 | Ebisu et al. |
| 2012/0088045 | A1* | 4/2012 | Veerasamy ........... E06B 3/6612 428/34 |
| 2014/0335291 | A1 | 11/2014 | Hasegawa et al. |
| 2015/0068666 | A1 | 3/2015 | Abe et al. |
| 2016/0298377 | A1 | 10/2016 | Kawashima et al. |
| 2017/0268285 | A1 | 9/2017 | Abe et al. |

FOREIGN PATENT DOCUMENTS

| JP | H11-343151 A | 12/1999 |
| JP | 2001-316138 A | 11/2001 |
| JP | 2004-094117 A | 3/2004 |
| JP | 2015-110494 A | 6/2015 |
| WO | 2013/132866 A1 | 9/2013 |
| WO | 2013/172033 A1 | 11/2013 |
| WO | 2014/136152 A1 | 9/2014 |
| WO | 2016/084382 A1 | 6/2016 |

OTHER PUBLICATIONS

Innternational Search Report and Written Opinion issued in International Patent Application No. PCT/JP2017/030675, dated Nov. 28, 2017; with partial English translation.

* cited by examiner

US 10,787,856 B2

GLASS PANEL UNIT AND GLASS WINDOW

CROSS-REFERENCE OF RELATED APPLICATIONS

This application is the U.S. National Phase under 35 U.S.C. § 371 of International Patent Application No. PCT/JP2017/030675, filed on Aug. 28, 2017, which in turn claims the benefit of Japanese Application No. 2016-170366, filed on Aug. 31, 2016, the entire disclosures of which Applications are incorporated by reference herein.

TECHNICAL FIELD

The present invention relates to a glass panel unit and a glass window.

BACKGROUND ART

Patent Literature 1 discloses a multi-pane glazing. The multi-pane glazing disclosed in Patent Literature 1 includes a first panel, a second panel arranged to face the first panel, and a sealing member that hermetically bonds the first and second panels together. The multi-pane glazing further includes a plurality of spacers arranged in an internal space, which forms a reduced-pressure space when hermetically sealed by the first panel, the second panel, and the sealing member, so as to be in contact with the first and second panels.

When exposed to the atmospheric pressure, the first and second panels attempt to flex themselves toward each other (i.e., in a direction in which these panels come closer to each other). Meanwhile, the spacers come into contact with, and support, both of the first and second panels that are going to flex themselves, thus maintaining the internal space.

The multi-pane glazing disclosed in Patent Literature 1 is fragile, because when the surface of the glass is subjected to some impact force, the first and second panels tend to collide against each other.

CITATION LIST

Patent Literature

Patent Literature 1: JP H11-311069 A

SUMMARY OF INVENTION

It is therefore an object of the present invention to provide a glass panel unit and a glass window, which are configured to reduce the chances of the first and second panels coming into contact with each other, and doing damage to the spacers, even when subjected to some impact force.

A glass panel unit according to an aspect of the present invention includes: a first panel including at least a first glass pane; and a second panel arranged to face the first panel with a predetermined gap left with respect to the first panel and including at least a second glass pane. The glass panel unit further includes: a sealing member arranged between the first panel and the second panel to hermetically bond the first panel and the second panel together; and an internal space configured to form a reduced-pressure space by being sealed hermetically with the first panel, the second panel, and the sealing member. The glass panel unit further includes a spacer arranged in the internal space so as to be in contact with the first panel and the second panel. The spacer includes a plurality of resin layers that are stacked one on top of another in a facing direction in which the first panel and the second panel face each other. At least any two of the plurality of resin layers have different elastic moduli.

A glass window according to another aspect of the present invention includes: the glass panel unit described above; and a window frame fitted onto a peripheral portion of the glass panel unit.

BRIEF DESCRIPTION OF DRAWINGS

FIGS. 8A and 8B are cross-sectional views illustrating another variation of a spacer for the glass panel unit, wherein FIG. 8A illustrates a state where no significant force is applied to the spacer, and FIG. 8B illustrates a state where significant force is applied to the spacer;

DESCRIPTION OF EMBODIMENTS

A first embodiment generally relates to a glass panel unit, and more particularly relates to a glass panel unit in which a reduced-pressure internal space, of which the pressure is lower than the atmospheric pressure (and which may be in a vacuum state as will be applied to the other embodiments to be described below), is formed by a first panel, a second panel, and a sealing member that hermetically bonds the first panel and the second panel together.

Figure 1:
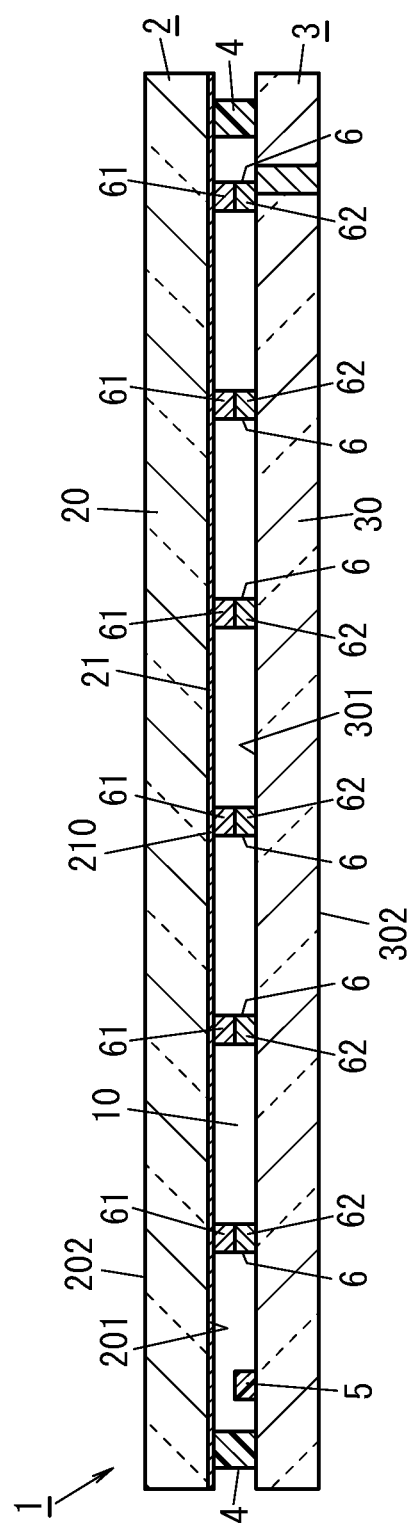
FIG. 1 is a schematic cross-sectional view of a glass panel unit according to a first embodiment of the present invention.
Figure 2:
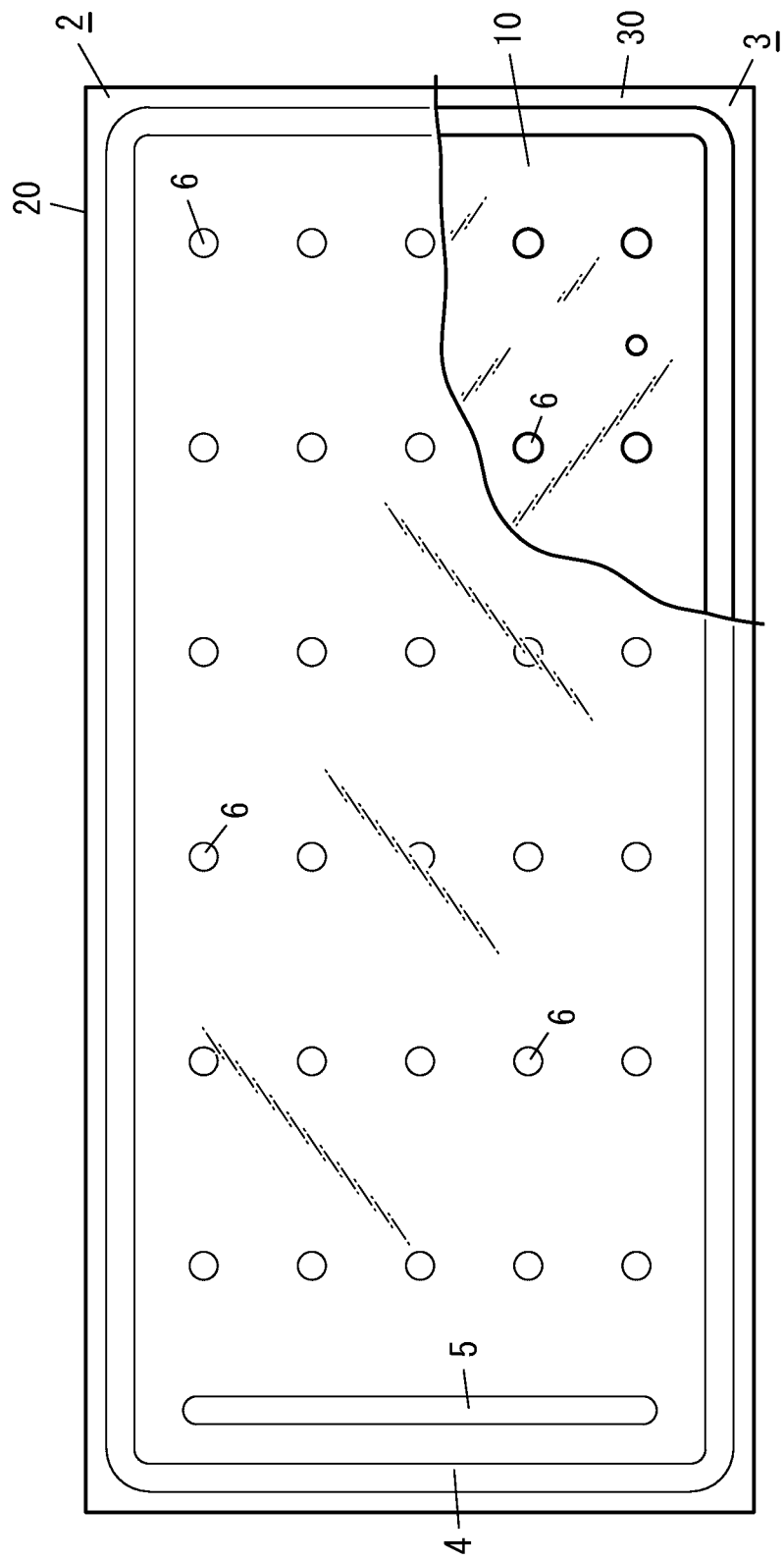
FIG. 2 is a partially cutaway plan view of the glass panel unit of the first embodiment.

FIGS. 1 and 2 illustrate a glass panel unit 1 according to the first embodiment. The glass panel unit 1 of the first embodiment is implemented as a thermally insulating glass panel unit. The thermally insulating glass panel unit is a type of multi-pane glazing including at least one pair of glass panels.

The glass panel unit 1 of the first embodiment includes a first panel 2, a second panel 3, a sealing member 4, an internal space 10, a gas adsorber 5, and spacers 6.

The first panel 2 includes a glass pane (hereinafter referred to as a "first glass pane 20") defining the planar shape of the first panel 2 and a coating 21 as shown in FIGS. 1 and 2. Note that the first panel 2 may consist of the first glass pane 20 alone. In short, the first panel 2 includes at least the first glass pane 20.

The first glass pane 20 is a rectangular flat plate and has a first surface 201 and a second surface 202, which are parallel to each other in the thickness direction. Both of the first surface 201 and second surface 202 of the first glass pane 20 are planar surfaces. Examples of materials for the first glass pane 20 include soda lime glass, high strain point glass, chemically tempered glass, alkali-free glass, quartz glass, Neoceram, and thermally tempered glass. However, these materials are only examples and should not be construed as limiting.

The coating 21 is formed on the first surface 201 of the first glass pane 20. The coating 21 may be configured as a low-emissivity (low-e) film 210 such as an infrared reflective film. However, the coating 21 does not have to be a low-emissivity film 210 but may also be any other type of film with a predetermined physical property.

The second panel 3 includes a glass pane (hereinafter referred to as a "second glass pane 30") defining the planar shape of the second panel 3. The second glass pane 30 is a rectangular flat plate and has a first surface 301 and a second surface 302, which are parallel to each other in the thickness direction. Both of the first surface 301 and second surface 302 of the second glass pane 30 are planar surfaces.

The second glass pane 30 has the same planar shape and the same planar dimensions as the first glass pane 20. Also, the second glass pane 30 is as thick as the first glass pane 20. Examples of materials for the second glass pane 30 include soda lime glass, high strain point glass, chemically tempered glass, alkali-free glass, quartz glass, Neoceram, and thermally tempered glass. However, these materials are only examples and should not be construed as limiting.

The second panel 3 consists of the second glass pane 30 alone as shown in FIGS. 1 and 2. That is to say, no coatings are provided for the second panel 3 and the second panel 3 is the second glass pane 30 itself. The first panel 2 and the second panel 3 are different only in that the coating 21 is provided for the first panel 2 but no coatings are provided for the second panel 3. Optionally, the second panel 3 may have any of its surfaces provided with a coating as well. In that case, the coating to be provided, as well as the coating 21 for the first panel 2, may be configured as a film with a predetermined physical property such as an infrared reflective film. In such an alternative embodiment, the second panel 3 includes the second glass pane 30 and the coating. In short, the second panel 3 includes at least the second glass pane 30.

The second panel 3 is arranged to face the first panel 2 with a predetermined gap left with respect to the first panel 2. Specifically, the first panel 2 and the second panel 3 are arranged such that the first surface 201 of the first panel 2 and the first surface 301 of the second panel 3 are parallel to each other and face each other with a predetermined gap left between themselves. In addition, the first panel 2 and the second panel 3 are arranged such that when viewed perpendicularly to the plate surface (i.e., the first surface 201 of the first glass pane 20 and the first surface 301 of the second glass pane 30), the profile of the first glass pane 20 agrees with that of the second glass pane 30.

The sealing member 4 is arranged between the first panel 2 and the second panel 3 as shown in FIGS. 1 and 2 to hermetically bond the first panel 2 and the second panel 3 together, thus forming an internal space 10 surrounded with the first panel 2, the second panel 3, and the sealing member 4.

The sealing member 4 is made of a thermal adhesive. The thermal adhesive may be a glass frit, for example. The glass frit may be, for example, a so-called "low-melting grit frit" with a predetermined softening point (softening temperature). Examples of the low-melting glass frits include a bismuth-based glass frit, a lead-based glass frit, and a vanadium-based glass frit.

The sealing member 4 has a rectangular frame shape. When viewed perpendicularly to the plate surface of the glass panel unit 1, the profile of the sealing member 4 is almost the same as that of the first glass pane 20 and the second glass pane 30. Actually, the profile of the sealing member 4 is smaller than that of the first glass pane 20 and the second glass pane 30. The sealing member 4 is arranged along the respective peripheral portions of the first glass pane 20 and the second glass pane 30. That is to say, the sealing member 4 is formed to surround almost the entire space between the first glass pane 20 and the second glass pane 30.

The gas adsorber 5 is arranged in the internal space 10 surrounded with the first panel 2, the second panel 3, and the sealing member 4 as shown in FIGS. 1 and 2. The gas adsorber 5 is used to adsorb unnecessary gases (such as a residual gas). Examples of the unnecessary gases include a gas emitted from the sealing member 4 being heated.

The gas adsorber 5 includes a getter. The getter is a material having the property of adsorbing molecules, of which the size is smaller than a predetermined one. The getter may be an evaporating getter, for example. The evaporating getter has the property of releasing adsorbed molecules when heated to a temperature equal to or higher than an activation temperature. Examples of the evaporating getter include zeolite and ion-exchanged zeolite (such as copper-ion-exchanged zeolite).

The internal space 10 is formed by exhausting the internal air. In other words, the internal space 10 is a reduced-pressure space (which may also be a vacuum space), of which the pressure is equal to or less than a predetermined value. The predetermined value may be, but does not have to be, 0.1 Pa.

The spacers 6 are made of a resin. The spacers 6 are used to maintain a predetermined gap between the first panel 2 and the second panel 3 as shown in FIGS. 1 and 2. In particular, since the internal space 10 is a reduced-pressure space, the first panel 2 and the second panel 3 attempt, when their respective second surfaces 202 and 302 are exposed to the atmospheric pressure, to flex themselves toward each other (i.e., in a direction in which these panels come closer to each other). The spacers 6 maintain the internal space 10 by supporting the first panel 2 and the second panel 3 that are attempting to flex themselves.

These spacers 6 are arranged in the internal space 10. Specifically, the spacers 6 are arranged at respective intersections of a virtual rectangular grid. The spacers 6 are arranged to be in contact with both of the first panel 2 and the second panel 3 even when no forces, other than the atmospheric pressure, are applied to the first panel 2 or the second panel 3.

The interval between the spacers 6 may be 2 cm, for example. Note that the dimensions, shape, number, interval, and arrangement pattern of the spacers 6 may be selected appropriately.

The spacers 6 are typically made of a transparent material. However, this is only an example and should not be construed as limiting. Alternatively, the spacers 6 may also be made of an opaque material if their size is sufficiently small.

Furthermore, a material that is not deformed at the softening point of the thermal adhesive for use as the sealing member 4 is selected as a material for the spacers 6.

The spacers 6 each have the shape of a circular column, of which the height is approximately equal to the gap between the first surface 201 of the first panel 2 and the first surface 301 of the second panel 3. For example, the spacers 6 may have a diameter of 1 mm and a height of 100 μm. Alternatively, the spacers 6 may also have any other shape such as a prism shape or a spherical shape.

As shown in FIG. 1, the spacers 6 each include two resin layers 61 and 62, which are stacked one on top of another in the direction in which the first panel 2 and the second panel 3 face each other. The resin layer 61 is in contact with the first panel 2, and the resin layer 62 is in contact with the second panel 3. These two resin layers 61 and 62 have different elastic moduli. Specifically, the elastic modulus of the resin layer 61 is smaller than that of the resin layer 62.

Figure 3:
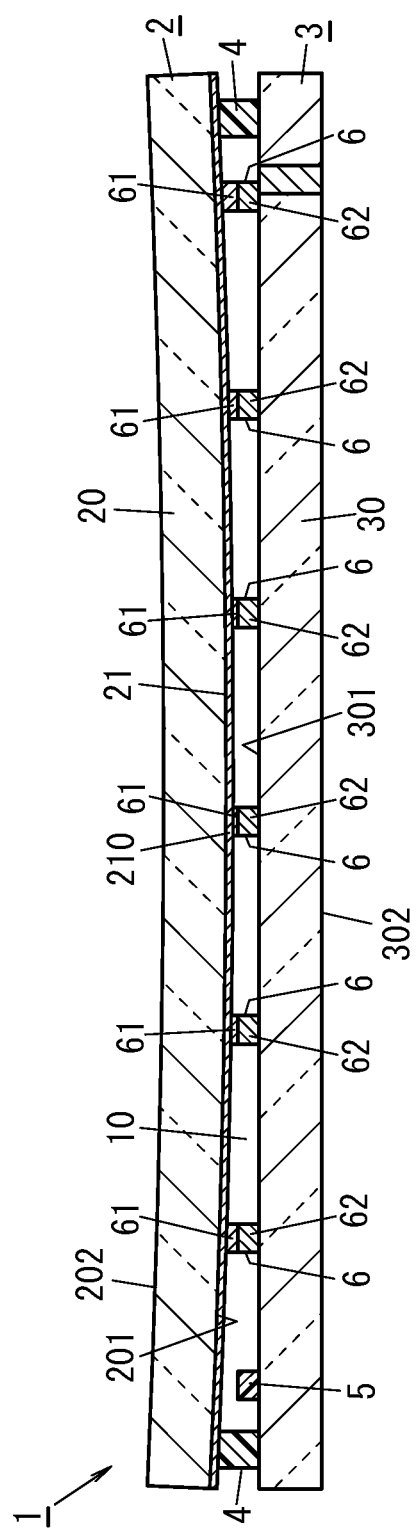
FIG. 3 is a schematic cross-sectional view illustrating a state where the glass panel unit is subjected to impact.

This allows, when the first panel 2 is subjected to impact force, for example, the resin layer 61 with the smaller elastic modulus to be compressed significantly and allows the first panel 2 to be flexed significantly as shown in FIG. 3, thus applying force to a lot of spacers 6 broadly and making the applied force broadly distributed. The same statement applied to a situation where the second panel 3 is subjected to impact force as well.

Suppose each of the spacers 6 were made entirely of a resin having the same elastic modulus as the resin layer 62 with the larger elastic modulus. In such a situation, when the first panel 2 is subjected to impact force, for example, the first panel 2 would not be flexed significantly and the force would be applied locally to only the spacers 6 around the point to which the impact force is applied. This would do significant damage to the spacers 6 located around the point to which the impact force is applied. In contrast, the spacers 6 according to the first embodiment reduce the chances of such a situation arising.

Meanwhile, suppose each of the spacers 6 were made entirely of a resin having the same elastic modulus as the resin layer 61 with the smaller elastic modulus. In such a situation, when the first panel 2 is subjected to impact force, for example, the first panel 2 would be flexed so significantly as to bring the first panel 2 into contact with the second panel 3, thus often doing damage to the first panel 2. In contrast, the spacers 6 according to the first embodiment also reduce the chances of such a situation arising.

Figure 4:
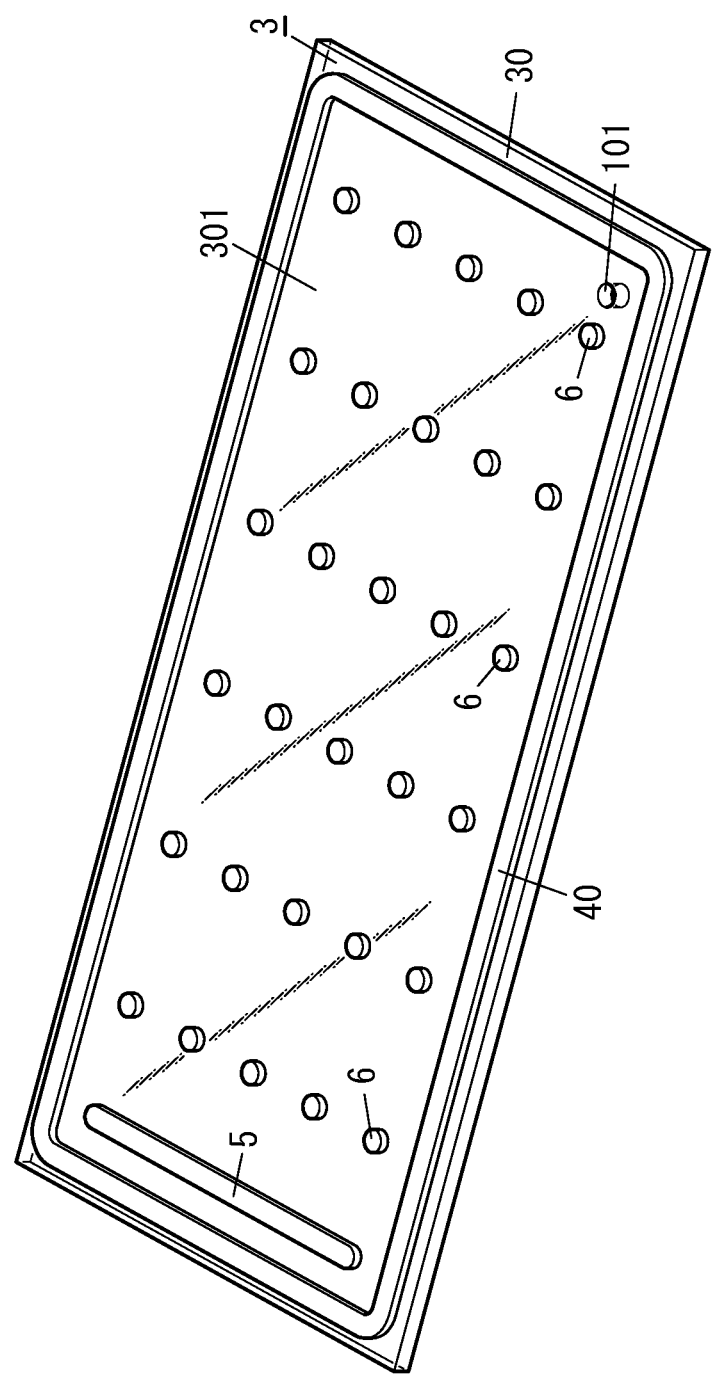
FIG. 4 illustrates one step of a method for manufacturing the glass panel unit of the first embodiment.
Figure 5:
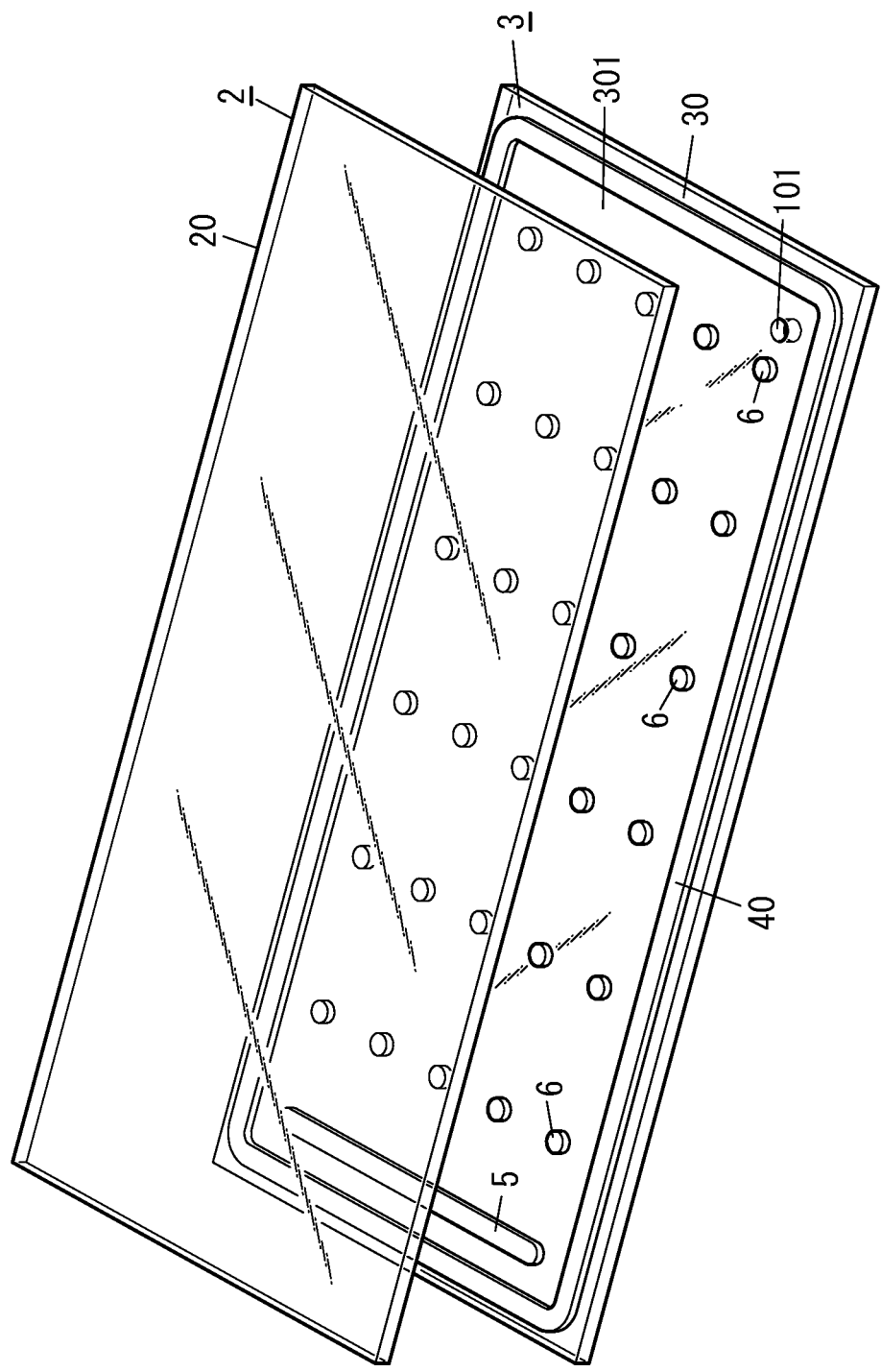
FIG. 5 illustrates another step of the method for manufacturing the glass panel unit of the first embodiment.
Figure 6:
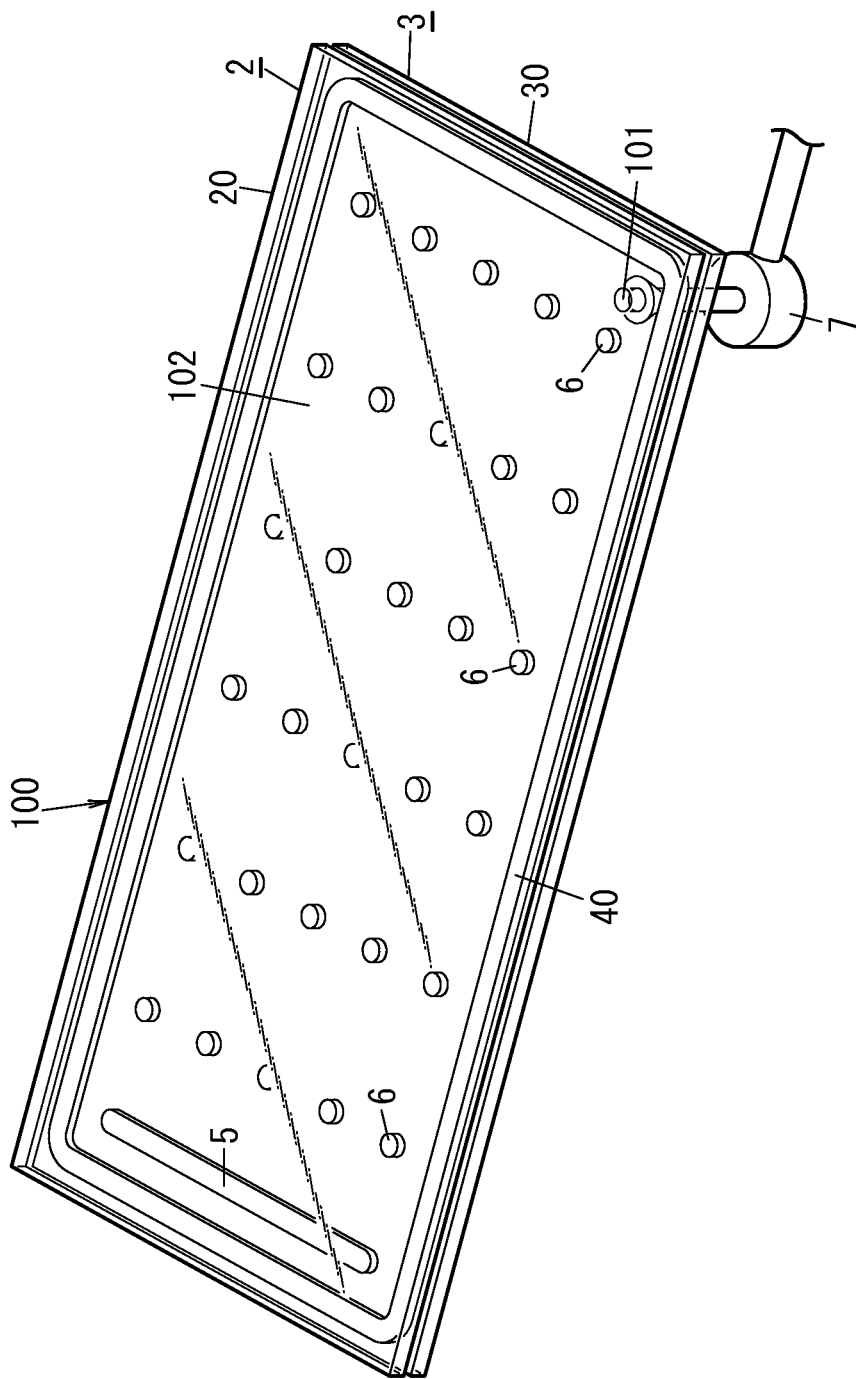
FIG. 6 illustrates still another step of the method for manufacturing the glass panel unit of the first embodiment.

Next, an exemplary method for manufacturing the glass panel unit 1 according to the first embodiment will be outlined with reference to FIGS. 4-6.

According to this method for manufacturing the glass panel unit 1, first, an assembly 100 (see FIG. 6), of which the internal space 102 is not hermetically sealed, is prepared. Next, the internal space 102 of the assembly 100 is sealed hermetically to create a reduced-pressure state inside, and thereby obtain a final product of the glass panel unit 1.

To make the assembly 100, first, the first glass pane 20 and the second glass pane 30 are provided.

Next, the first surface 201 of the first glass pane 20 is coated with the coating 21 to form the first panel 2.

Subsequently, an evacuation port 101 is cut through the second panel 3 consisting of the second glass pane 30. Alternatively, the evacuation port 101 may be cut through the first panel 2 instead.

Then, a thermal adhesive 40 to be the sealing member 4 is arranged in a ring on the peripheral portion of the first surface 301 of the second panel 3.

Thereafter, as shown in FIG. 4, the gas adsorber 5 and the spacers 6 are arranged inside of the thermal adhesive 40 arranged in a ring on the first surface 301 of the second panel 3.

Next, as shown in FIG. 5, the first panel 2 is put on the thermal adhesive 40 on the second panel 3 to stack the first panel 2 on the second panel 3.

In this manner, the assembly 100 shown in FIG. 6 is obtained. Thereafter, the internal space 102 of the assembly 100 is sealed hermetically to create a reduced-pressure state and obtain a final product of the glass panel unit 1.

To obtain a final product of the glass panel unit 1, first, the assembly 100 is heated. In this case, the assembly 100 is heated such that the temperature of the thermal adhesive 40 is increased to a temperature equal to or higher than the softening temperature of the thermal adhesive 40. This allows the thermal adhesive 40 to be melted once to hermetically bond the first panel 2 and the second panel 3 together. When cooled, the thermal adhesive 40 that has once been melted is solidified to serve as the sealing member 4.

Next, as shown in FIG. 6, the internal space 102 is evacuated through the evacuation port 101 of the second panel 3 by a vacuum pump 7.

Thereafter, the evacuation port 101 cut through the second panel 3 is closed to hermetically seal the internal space 102.

In this manner, a final product of the glass panel unit 1 is obtained.

Note that this method for manufacturing the glass panel unit 1 is only an example and should not be construed as limiting.

Next, variations of the spacers 6 will be described.

First of all, the variation shown in FIG. 7 will be described. In this variation, the spacers 6 each include three resin layers 611, 621, and 631.

These resin layers 611, 621, and 631 are symmetric to each other in the direction in which the first panel 2 and the second panel 3 face each other. That is to say, the resin layers 611 and 631 not only are made of the same material but also have the same thickness as well.

The elastic modulus of the resin layer 621 is greater than that of the resin layers 611 and 631.

Figure 7:
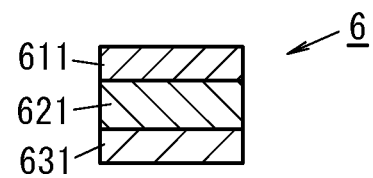
FIG. 7 is a cross-sectional view illustrating a variation of a spacer for the glass panel unit.

The spacers 6 according to the variation shown in FIG. 7 have a vertically symmetric distribution of thermal expansion coefficients. This reduces the chances of the spacers 6 being warped during the step of forming the spacers 6.

Next, the variation shown in FIGS. 8A and 8B will be described. In this variation, the spacers 6 each include three resin layers 612, 622, and 632.

Furthermore, these resin layers 612, 622, and 632 are symmetric to each other in the direction in which the first panel 2 and the second panel 3 face each other. That is to say, the resin layers 612 and 632 not only are made of the same material but also have the same thickness as well.

The elastic modulus of the resin layer 622 is smaller than that of the resin layers 612 and 632. The resin layer 622 with the smaller elastic modulus has greater visible light transmittance than the resin layers 612 and 632.

Figure 8A:
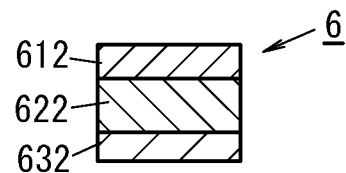
Figure 8B:
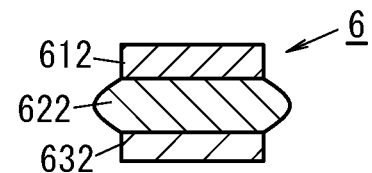

The spacers 6 according to the variation shown in FIGS. 8A and 8B have a vertically symmetric distribution of thermal expansion coefficients. This reduces the chances of the spacers 6 being warped during the step of forming the spacers 6.

In addition, the resin layers 612 and 632, which are in contact with the first panel 2 and the second panel 3, respectively, and to which significant force is applied, have a greater elastic modulus than the resin layer 622, which is in contact with neither the first panel 2 nor the second panel 3, and to which significant force is not applied. This reduces the damage to be done to the spacers 6.

Furthermore, even when squashed and expanded under pressure as shown in FIG. 8B, the resin layer 622, having the smaller elastic modulus, is much less recognizable because the resin layer 622 has the greater visible light transmittance.

Figure 9:
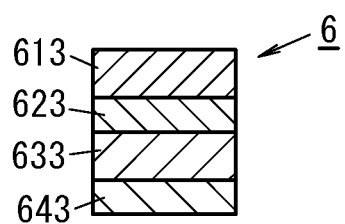
FIG. 9 is a cross-sectional view illustrating still another variation of a spacer for the glass panel unit.

Next, the variation shown in FIG. 9 will be described. In this variation, the spacers 6 each include four resin layers 613, 623, 633, and 643.

Optionally, the spacers 6 may each include five or more resin layers as well.

Next, the variation shown in FIG. 10 will be described. In this variation, the spacers 6 each include three resin layers 614, 624, and 634.

Furthermore, these resin layers 614, 624, and 634 are symmetric to each other in the direction in which the first panel 2 and the second panel 3 face each other. That is to say, the resin layers 614 and 634 not only are made of the same material but also have the same thickness as well.

The elastic modulus of the resin layer 624 is smaller than that of the resin layers 614 and 634.

Furthermore, at least one resin layer (e.g., the resin layer 624) having the smaller elastic modulus has a greater overall thickness than at least one other resin layer having the larger elastic modulus (e.g., the resin layers 614 and 634).

Figure 10:
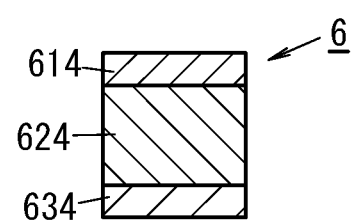
FIG. 10 is a cross-sectional view illustrating yet another variation of a spacer for the glass panel unit.

The spacers 6 according to the variation shown in FIG. 10 have a vertically symmetric distribution of thermal expansion coefficients. This reduces the chances of the spacers 6 being warped during the step of forming the spacers 6.

In addition, the resin layers 614 and 634, which are in contact with the first panel 2 and the second panel 3, respectively, and to which significant force is applied, have a greater elastic modulus than the resin layer 624, which is in contact with neither the first panel 2 nor the second panel 3, and to which significant force is not applied. This reduces the damage to be done to the spacers 6.

This further reduces the impact force applied to the first panel 2 or the second panel 3.

Optionally, in each of these spacers 6, to make each of the resin layers with different elastic moduli thick enough, a plurality of thin resin layers, each having the same elastic modulus, may be stacked one on top of another. For example, the resin layer 624 may be made thick enough by stacking a plurality of thin resin films, each having the same elastic modulus, one on top of another. This improves the strength of the resin layer by vaporizing the solvent thereof sufficiently, thus obtaining spacers 6 with high mechanical strength.

In the first embodiment described above, the first panel 2 and the second panel 3 each have a rectangular shape. However, this is only an example and should not be construed as limiting. Also, in the first embodiment described above, the first panel 2 and the second panel 3 are each configured as a flat plate with a flat surface. However, this is only an example and should not be construed as limiting. Alternatively, the first panel 2 and the second panel 3 may each have unevenness or a curved surface.

Also, in the first embodiment described above, when viewed perpendicularly to the plate surface, the profile of the first panel 2 agrees with that of the second panel 3. However, this is only an example and should not be construed as limiting. Alternatively, their profiles may disagree with each other.

Optionally, the first panel 2 and the second panel 3 may each be a wired glass panel. That is to say, wires made of a non-glass material such as a metallic material may be embedded in each of the first glass pane 20 and the second glass pane 30. Alternatively, the first panel 2 and the second panel 3 may each include a member made of a non-glass material such as a metallic material.

In the first embodiment described above, the first panel 2 includes the coating 21. However, this is only an example and should not be construed as limiting. Alternatively, the first panel 2 may include no coatings 21.

In the first embodiment described above, the second panel 3 includes no coatings 21. However, this is only an example and should not be construed as limiting. Alternatively, the second panel 3 may include the coating 21.

Furthermore, in the first embodiment described above, the glass panel unit 1 includes the gas adsorber 5. However, this is only an example and should not be construed as limiting. Alternatively, the glass panel unit 1 may include no gas adsorber 5.

Figure 11:
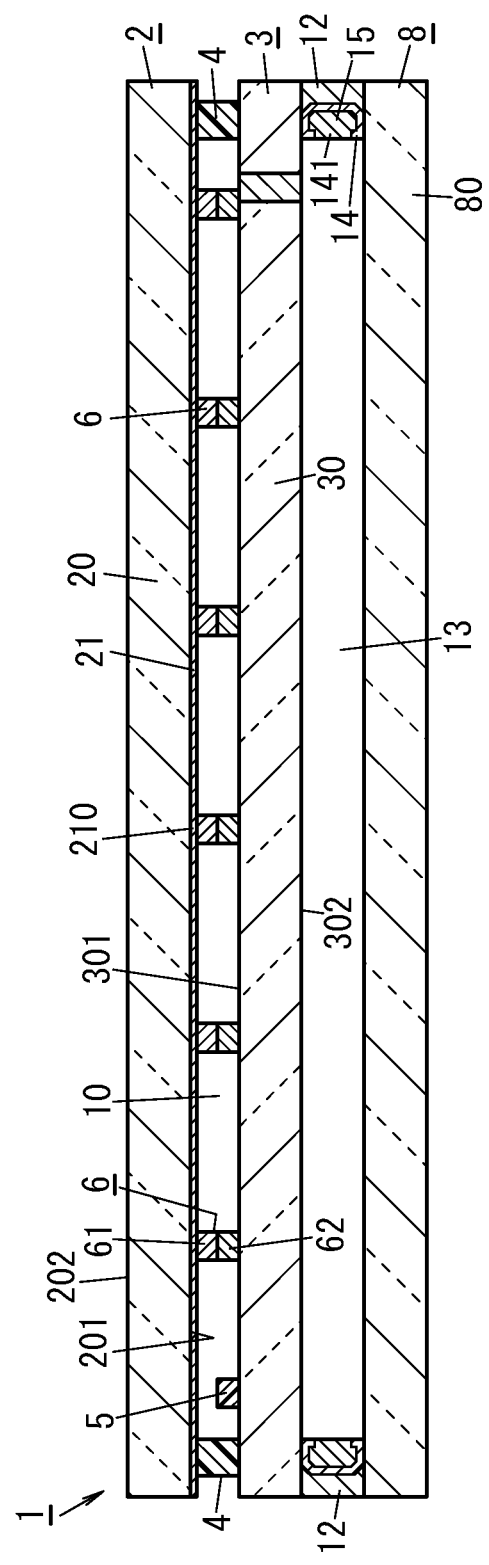
FIG. 11 is a schematic cross-sectional view of a glass panel unit according to a second embodiment of the present invention.

Next, a second embodiment will be described with reference to FIG. 11. Note that the second embodiment includes some additional constituent elements, as well as every constituent element of the first embodiment. In the following description, any constituent member of the second embodiment having the same function as a counterpart of the first embodiment described above will be designated by the same reference numeral as that counterpart's, and a detailed description thereof will be omitted herein. Thus, the following description will be focused on their difference in configuration.

A glass panel unit 1 according to the second embodiment includes a third panel 8 arranged to face the second panel 3.

The third panel 8 includes a third glass pane 80. The third glass pane 80 has a flat surface and a predetermined thickness. In this second embodiment, the third panel 8 consists of the third glass pane 80 alone.

Optionally, the third panel 8 may have any of its surfaces provided with a coating as well. In that case, the coating may be configured as a film with a predetermined physical property such as an infrared reflective film. In such an alternative embodiment, the third panel 8 includes the third glass pane 80 and the coating. In short, the third panel 8 includes at least the third glass pane 80.

The glass panel unit 1 further includes a second sealing member 12, which is arranged between the second panel 3 and the third panel 8 to hermetically bond the second panel 3 and the third panel 8 together. More specifically, the second sealing member 12 is arranged in a ring between the respective peripheral portions of the second panel 3 and the third panel 8. The second sealing member 12 may be made of a thermal adhesive. Specifically, the second sealing member 12 may be made of the same thermal adhesive as, or a different thermal adhesive from, the sealing member 4 (hereinafter referred to as a "first sealing member") without limitation.

The glass panel unit 1 includes a second internal space 13, in which a dry gas is enclosed and which is created by hermetically bonding the second panel 3 and the third panel 8 together with the second sealing member 12. As the dry gas, a dry rare gas such as an argon gas or dry air may be, but does not have to be, used.

In addition, a hollow frame member 14 is arranged in a ring inside of the second sealing member 12 between the respective peripheral portions of the second panel 3 and the third panel 8. A through hole 141 communicating with the second internal space 13 is cut through the frame member 14. A desiccant 15 such as a silica gel is introduced into the frame member 14.

The second panel 3 and the third panel 8 may be bonded together in almost the same way as the first panel 2 and the second panel 3. Nevertheless, even though the internal space 10 (hereinafter referred to as a "first internal space") surrounded with the first panel 2, the second panel 3, and the sealing member 4 is a reduced-pressure space, the second internal space 13 is not a reduced-pressure space but has a dry gas enclosed, which is a difference between these two pairs of panels.

The glass panel unit 1 according to the second embodiment achieves an even higher degree of thermal insulation properties.

Figure 12:
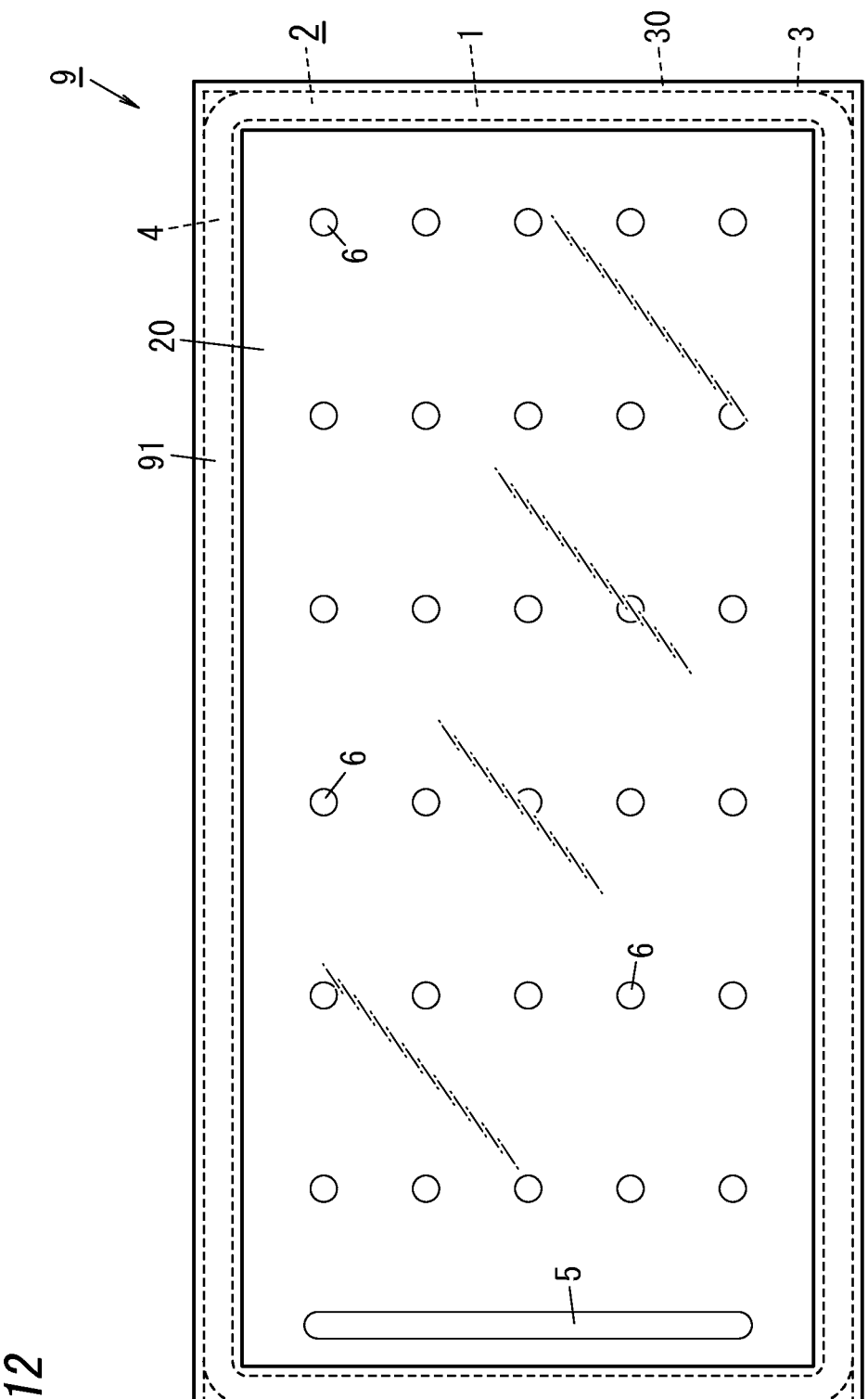
FIG. 12 is a schematic plan view of a glass window including the glass panel unit.

Next, a third embodiment will be described with reference to FIG. 12. Note that the third embodiment includes some additional constituent elements, as well as every constituent element of the first or second embodiment. In the following description, any constituent member of the third embodiment having the same function as a counterpart of the first or second embodiment described above will be designated by the same reference numeral as that counterpart's, and a detailed description thereof will be omitted herein. Thus, the following description will be focused on their difference in configuration.

The third embodiment uses the glass panel unit 1 of the first or second embodiment described above. A window frame 91 with a U-cross section is fitted onto the outer peripheral portion of this glass panel unit 1, thus forming a glass window 9.

The glass window 9 according to the third embodiment achieves an even higher degree of thermal insulation properties.

As can be seen from the foregoing description of the first to third embodiments, a glass panel unit 1 according to a first implementation includes: a first panel 2 including at least a first glass pane 20; and a second panel 3 arranged to face the first panel 2 with a predetermined gap left with respect to the first panel 2 and including at least a second glass pane 30. The glass panel unit 1 further includes: a sealing member 4 arranged between the first panel 2 and the second panel 3 to hermetically bond the first panel 2 and the second panel 3 together; and an internal space 10 configured to form a reduced-pressure space by being sealed hermetically with the first panel 2, the second panel 3, and the sealing member 4. The glass panel unit 1 further includes a spacer 6 arranged in the internal space 10 so as to be in contact with the first panel 2 and the second panel 3. The spacer 6 includes a plurality of resin layers 61, 62, 611, 621, 631, 612, 622, 632, 613, 623, 633, 643, 614, 624, and 634 that are stacked one on top of another in a facing direction in which the first panel 2 and the second panel 3 face each other. At least any two of the plurality of resin layers have different elastic moduli.

The glass panel unit 1 according to the first implementation reduces the damage done to the spacers 6 by maintaining elastic force to the degree of preventing the first panel 2 and the second panel 3 from coming into contact with each other, and by preventing impact force from being focused onto some spacers 6, even when the first panel 2 or the second panel 3 is subjected to some impact force.

A glass panel unit 1 according to a second implementation may be implemented in combination with the first implementation. In the second implementation, the plurality of resin layers includes three or more resin layers 611, 621, 631, 612, 622, 632, 614, 624, and 634, and the spacer 6 is symmetric with respect to a plane that passes through a midpoint between the first panel 2 and the second panel 3 in the facing direction and that is perpendicular to the facing direction.

The glass panel unit 1 according to the second implementation makes the distribution of thermal expansion coefficients of the spacer 6 vertically symmetric, thus reducing the chances of the spacer 6 being warped during the step of forming the spacers 6.

A glass panel unit 1 according to a third implementation may be implemented in combination with the first or second implementation. In the third implementation, the plurality of resin layers includes three or more resin layers 611, 621, 631, 612, 622, 632, 614, 624, and 634. Two resin layers, which are in contact with the first panel 2 and the second panel 3, respectively, out of the three or more resin layers 611, 621, 631, 612, 622, 632, 614, 624, and 634 have a greater elastic modulus than at least one other resin layer, which is in contact with neither the first panel 2 nor the second panel 3, out of the three or more resin layers 611, 621, 631, 612, 622, 632, 614, 624, and 634.

The glass panel unit 1 according to the third implementation reduces the damage to be done onto the spacers 6 by making the resin layers 612, 632, 614, and 634, each of which is in contact with the first panel 2 or the second panel 3 and to which significant force is applied, of a material with a greater elastic modulus than the resin layers 622, 624, which are in contact with neither the first panel 2 nor the second panel 3 and to which no significant force is applied.

A glass panel unit 1 according to a fourth implementation may be implemented in combination with any one of the first to third implementations. In the fourth implementation, at least one resin layer 624, having the smaller one of the two elastic moduli, out of the plurality of resin layers 614, 624, and 634 has a greater overall thickness than at least one other resin layer 614, 634, having the larger one of the two elastic moduli, out of the plurality of resin layers 614, 624, and 634.

The glass panel unit 1 according to the fourth implementation further reduces the impact force applied to the first panel 2 or the second panel 3.

A glass panel unit 1 according to a fifth implementation may be implemented in combination with any one of the first to fourth implementations. In the fifth implementation, one resin layer 622, having the smallest elastic modulus, out of the plurality of resin layers has a greater visible light transmittance than any other one of the plurality of resin layers.

The glass panel unit 1 according to the fifth implementation makes the resin layer 622, having the smallest elastic modulus and squashed and expanded under pressure, much less recognizable, because the resin layer 622 has the greatest visible light transmittance.

A glass panel unit 1 according to a sixth implementation may be implemented in combination with any one of the first to fifth implementations. The glass panel unit 1 according to the sixth implementation further includes: a third panel 8 arranged opposite from the first panel 2 so as to face the second panel 3; a second sealing member 12 arranged between the second panel 3 and the third panel 8 to hermetically bond the second panel 3 and the third panel 8 together; and a second internal space 13 sealed hermetically with the second panel 3, the third panel 8, and the second sealing member 12 and enclosing a dry gas airtightly.

The glass panel unit 1 according to the sixth implementation ensures further improved thermal insulation properties.

A glass window 9 according to a seventh implementation includes: the glass panel unit 1 according to any one of the first to sixth implementations; and a window frame 91 fitted onto a peripheral portion of the glass panel unit 1.

The glass window 9 according to the seventh implementation ensures further improved thermal insulation properties.

REFERENCE SIGNS LIST

1 Glass Panel Unit
10 Internal Space
12 Second Sealing Member
13 Second Internal Space
2 First Panel
201 First Surface
202 Second Surface
210 Low-Emissivity Film
3 Second Panel
301 First Surface
302 Second Surface
4 Sealing Member
6 Spacer
8 Third Panel
9 Glass Window
91 Window Frame

The invention claimed is:

1. A glass panel unit comprising
a first panel including at least a first glass pane;
a second panel arranged to face the first panel with a predetermined gap left with respect to the first panel and including at least a second glass pane;
a sealing member arranged between the first panel and the second panel to hermetically bond the first panel and the second panel together;
an internal space configured to form a reduced-pressure space by being sealed hermetically with the first panel, the second panel, and the sealing member; and
a spacer arranged in the internal space so as to be in contact with the first panel and the second panel,
the spacer including a plurality of resin layers that are stacked one on top of another in a facing direction in which the first panel and the second panel face each other, at least any two of the plurality of resin layers having different elastic moduli, and
one resin layer, having the smallest elastic modulus, out of the plurality of resin layers having a greater visible light transmittance than any other of the plurality of resin layers.

2. The glass panel unit of claim 1, wherein
the plurality of resin layers includes three or more resin layers, and
the spacer is symmetric with respect to a plane that passes through a midpoint between the first panel and the second panel in the facing direction and that is perpendicular to the facing direction.

3. The glass panel unit of claim 1, wherein
the plurality of resin layers includes three or more resin layers, and
two resin layers, which are in contact with the first panel and the second panel, respectively, out of the three or more resin layers have a greater elastic modulus than at least one other resin layer, which is in contact with neither the first panel nor the second panel, out of the three or more resin layers.

4. The glass panel unit of claim 1, wherein
each of the plurality of resin layers has one of two elastic moduli, and at least one resin layer, having the smaller one of the two elastic moduli, out of the plurality of resin layers has a greater overall thickness than at least one other resin layer, having the larger one of the two elastic moduli, out of the plurality of resin layers.

5. The glass panel unit of claim 1, further comprising:
a third panel arranged opposite from the first panel so as to face the second panel;
a second sealing member arranged between the second panel and the third panel to hermetically bond the second panel and the third panel together; and
a second internal space sealed hermetically with the second panel, the third panel, and the second sealing member and enclosing a dry gas airtightly.

6. A glass window comprising:
the glass panel unit of claim 1; and
a window frame fitted onto a peripheral portion of the glass panel unit.

* * * * *